United States Patent
Wanner et al.

(10) Patent No.: US 7,566,103 B2
(45) Date of Patent: Jul. 28, 2009

(54) METHOD FOR CONTROLLING A DRIVE SYSTEM AND/OR A WHEEL BRAKE SYSTEM

(75) Inventors: Peter Wanner, Vaterstetten (DE);
Andreas Pfeiffer, Holzkirchen (DE);
Emanuel Fuchs, Rochester, MI (US);
Hubert Schumacher, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 96 days.

(21) Appl. No.: 11/785,732

(22) Filed: Apr. 19, 2007

(65) Prior Publication Data

US 2007/0207895 A1   Sep. 6, 2007

Related U.S. Application Data

(63) Continuation of application No. PCT/EP2005/010552, filed on Sep. 30, 2005.

(30) Foreign Application Priority Data

Oct. 20, 2004   (DE) .................. 10 2004 050 995

(51) Int. Cl.
*B60T 8/60* (2006.01)
*B60W 10/18* (2006.01)
(52) U.S. Cl. .................. 303/155; 477/185; 477/204; 701/86
(58) Field of Classification Search .................. 303/121, 303/125, 151, 152, 155; 701/93, 94, 95, 701/86; 180/170, 175; 477/183, 185, 186, 477/187, 203, 204

See application file for complete search history.

(56) References Cited

U.S. PATENT DOCUMENTS

| 5,577,580 | A | 11/1996 | Polzin et al. | |
|---|---|---|---|---|
| 5,794,735 | A * | 8/1998 | Sigl | 180/170 |
| 6,287,237 | B1 | 9/2001 | Graf et al. | |
| 7,133,760 | B2 * | 11/2006 | Glora | 701/95 |
| 7,249,810 | B2 * | 7/2007 | Grupp et al. | 303/125 |
| 7,410,023 | B2 * | 8/2008 | Crombez | 180/170 |
| 7,448,983 | B2 * | 11/2008 | Doering et al. | 477/203 |

(Continued)

FOREIGN PATENT DOCUMENTS

| DE | 43 29 918 A1 | 3/1995 |
|---|---|---|
| DE | 197 07 140 C1 | 5/1998 |
| DE | 199 16 637 C1 | 11/2000 |
| DE | 102 29 035 A1 | 1/2004 |
| DE | 102 51 563 A1 | 5/2004 |

OTHER PUBLICATIONS

International Search Report dated Dec. 22, 2005 with English translation (Four (4) Pages).
German Search Report dated Jul. 1, 2005 with English translation (Eleven (11) Pages).
German Office Action dated Nov. 14, 2005 with English translation (Twenty-six (26) Pages).

*Primary Examiner*—Thomas J Williams
(74) *Attorney, Agent, or Firm*—Crowell & Moring LLP

(57) ABSTRACT

A method for controlling a drive system and/or a wheel braking system, a total braking torque consisting of a drive braking torque and/or a wheel braking torque to be applied to the wheels of a motor vehicle is adjusted such that the desired wheel braking torque is reduced by an amount which can be compensated by a (preferably maximally) possible increase of the drive braking torque, when the wheel braking system is particularly loaded and when the vehicle velocity is approximately constant (steady-state) operating mode. However, the increase of the drive braking torque is limited to a predefined amount (preferably achievable in the fired coasting operation) when the wheel braking system is loaded less highly or the vehicle velocity changes (dynamic operating mode).

3 Claims, 1 Drawing Sheet

U.S. PATENT DOCUMENTS

| | | | |
|---|---|---|---|
| 2003/0036839 A1* | 2/2003 | Han et al. | 701/70 |
| 2004/0119333 A1* | 6/2004 | Hackl | 303/125 |
| 2005/0065704 A1 | 3/2005 | Glora | |
| 2006/0100768 A1* | 5/2006 | Lock et al. | 701/93 |

* cited by examiner

METHOD FOR CONTROLLING A DRIVE SYSTEM AND/OR A WHEEL BRAKE SYSTEM

This application is a Continuation of PCT/EP2005/010552, filed Sep. 30, 2005, and claims the priority of DE 10 2004 050 995.6, filed Oct. 20, 2004, the disclosures of which are expressly incorporated by reference herein.

BACKGROUND AND SUMMARY OF THE INVENTION

The invention relates to a method of controlling a drive system and/or a wheel brake system.

In the case of motor vehicles having driver assistance systems, by which particularly a predefined speed or a predefined distance from a vehicle driving ahead is to be kept constant, methods are known by which a drive system and/or a wheel braking system can be controlled for achieving the driver assistance goals. Problems occur here again and again, particularly during downhill driving. Either the wheel braking systems are overheated, or operations of the drive system, such as the downshifting of automatic transmissions, or the change of coasting operation types (fired/non-fired), result in losses of comfort.

Examples of known methods of controlling drive systems and wheel braking systems, which generally already provide an increase of the drive braking torque or of the "engine brake" for protecting the wheel brake, are the objects of German Patent Documents DE 102 51 563 A1, DE 43 29 918 A1 and DE 197 07 140 C1.

It is an object of the invention to improve a method of controlling a drive system and a wheel braking system with regard to relieving the wheel braking system while comfort is simultaneously taken into account.

In the case of the method of the invention for controlling a drive system and a wheel braking system, a total braking torque consisting of a drive braking torque and a wheel braking torque to be applied to the wheels of a motor vehicle is particularly advantageously adjusted such that the desired wheel braking torque is reduced by an amount which can be compensated by a (preferably maximally) possible increase of the drive braking torque when the wheel braking system is particularly loaded (particularly when driving downhill) and when the vehicle velocity is approximately constant (steady-state operating mode). However, the increase of the drive braking torque is limited to a predefined amount (achievable, for example, in the fired coasting operation) when the wheel braking system is less loaded or the vehicle velocity changes (dynamic operating mode).

The total braking torque may, for example, be predefined by the driver's wish determined by means of a braking and/or accelerator pedal interpretation or by a driver assistance system ("cruise control", "ACC", etc.). The invention is particularly advantageous when it is used in motor vehicles with driver assistance systems aiming at keeping a predefined speed constant.

The presence of a defined increased loading of the wheel braking system can be recognized when, for example, a predefined wheel braking torque threshold is exceeded for a predefined minimal duration. However, operating parameters, such as temperatures pertaining to the wheel braking system or brake pressure values and the rotational speed or the velocity, can also be used for estimating the loading of the wheel braking system. Navigation data, by which a downhill drive can be anticipated, may even be used for estimating a loading of the wheel braking system to be expected.

The wheel braking torque is the fraction of the total braking torque applied to the wheels which is applied by the wheel braking system.

The drive braking torque is preferably the fraction of the total braking torque applied to the wheels which is applied by the entire drive system consisting of at least an engine and a transmission, in which case the engine as well as the transmission may be electronically controllable.

The reduction of the desired wheel braking torque first indicates a mathematically possible reduction. For, when, in the case of a not-by-wire braking system, the driver operates the brake pedal, an actual reduction of the wheel braking torque carried out by the wheel braking system can possibly not (immediately) be carried out. However, in this case, the drive braking torque according to the invention is nevertheless increased, so that first an addition of the increased drive braking torque to the total braking torque is carried out. However, it is expected that subsequently, because of the resulting noticeable braking effect, the driver will reduce the wheel braking pressure by returning the brake pedal. The driver is therefore used as part of the method according to the invention with respect to the actual reduction of the wheel braking pressure. In the case of an automatic wheel braking pressure control without operating the brake pedal or, in the case of an automatic wheel braking pressure control during interventions of a drive assistant system, particularly a cruise control system, the reduction of the desired wheel braking torque can be carried out immediately and fully automatically.

The invention is based on the following recognitions:

The first goal is the reduction of the braking load, in which case the exceeding of the braking load also comprises the exceeding of the braking load to be expected, so that the invention also intervenes preventively before the wheel braking system is actually considerably loaded. Basically, while taking into account demands on the drive system for relieving the wheel braking system, a drive braking torque which is as high as possible should be set. Here, the increase of the drive braking torque may first have an arbitrary course and may preferably always be adjusted in a maximally possible manner. The second goal is also the increase of comfort by taking into account driving conditions under which jumps in wheel torques are particularly noticeable to the driver. Tests have shown that changes, particularly sudden changes, as during a change from a fired coasting operation to a non-fired coasting operation and vice-versa, in the course of the increase of the drive braking torque, may have a particularly disadvantageous effect with respect to comfort in a dynamic operating mode. A dynamic operating mode manifests itself particularly in a change of the vehicle velocity. An increase of the drive braking torque without any limitation is therefore preferably permitted only at an at least almost constant vehicle velocity.

An embodiment of the invention is illustrated in the drawing. It applies to the case in which the total braking torque is predefined as a desired value by a driver assistance system.

Other objects, advantages and novel features of the present invention will become apparent from the following detailed description of the invention when considered in conjunction with the accompanying drawings.

DETAILED DESCRIPTION

Figure 2:
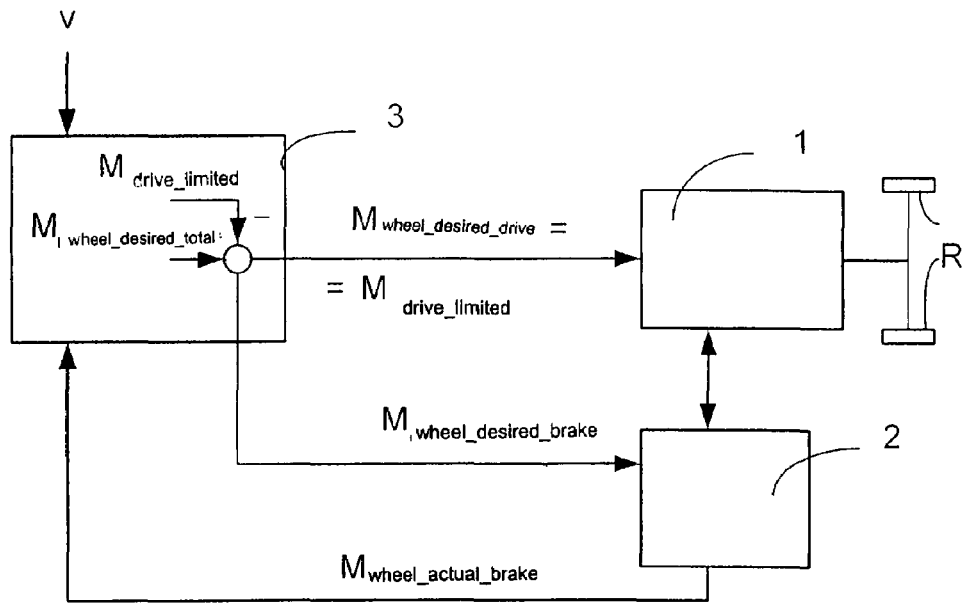
FIG. 2 is a view of a method of operation of a vehicle system compound operation for adjusting a total braking torque having a limited drive braking torque according to an embodiment of the invention.
Figure 1:
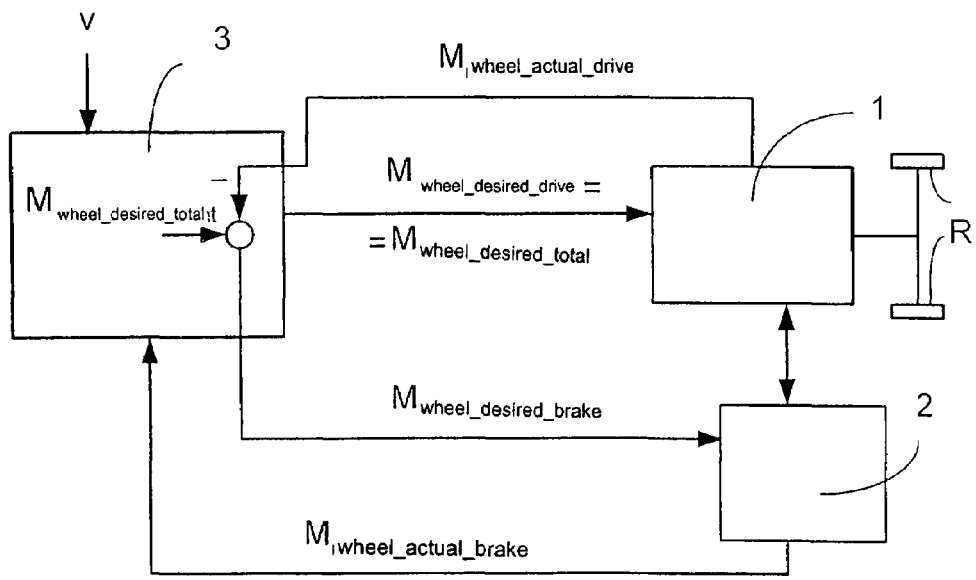
FIG. 1 is a view of a method of operation of a vehicle system compound arrangement for adjusting a total braking torque having an unlimited drive braking torque according to an embodiment of the invention.

FIGS. 1 and 2 respectively show the same vehicle system compound arrangement consisting of a drive system 1, a wheel braking system 2 and a driver assistance system 3. The systems 1 to 3, for example, each have an electronic control device, which are conventionally mutually connected by way of data bus systems. The method according to the invention can be carried out at least by means of one of these control devices.

In the present embodiment, the driver assistance system 3 for keeping a predefined desired vehicle velocity constant is to determine a total braking torque $M_{wheel\_desired\_total}$ required for this purpose. The total braking torque $M_{wheel\_desired\_total}$ corresponds to the wheel torques acting upon the driving wheels R.

The total braking torque ($M_{wheel\_desired\_total}$) to be applied to the wheels R of a motor vehicle can basically consist of a drive braking torque ($M_{wheel\_desired\_drive}$) and/or a wheel braking torque ($M_{wheel\_desired\_brake}$). The actual wheel braking torque ($M_{wheel\_actual\_brake}$) is detected here by the driver assistance system 3 and is monitored with respect to the loading of the wheel braking system.

When a defined increased loading of the wheel braking system is exceeded for a predefined minimum time period and the change of the vehicle velocity v within a predefined time window Δt, which may be equal to the predefined minimum time period, has not exceeded a tolerance range T around zero, the desired wheel braking torque $M_{wheel\_desired\_brake}$ is reduced by an amount which can be compensated by a preferably maximally possible increase of the drive braking torque ($M_{wheel\_desired\_drive}=M_{drive\_max}$). For this purpose, the control device of the driver assistance system 3 sends a prompt to a control device of the drive system 1, in which the total brake torque $M_{wheel\_desired\_total}$ is emitted as a desired drive braking torque $M_{wheel\_desired\_drive}$. As a function of additional operating parameters, the drive system 1 decides which maximally possible drive braking torque $M_{drive\_max}$ is adjusted in each case. The resulting actual drive braking torque $M_{wheel\_actual\_drive}$ is reported to the control device of the driver assistance system 3. The control device of the driver assistance system 3 forms the difference between the total braking torque $M_{wheel\_desired\_total}$ and the actual drive braking torque $M_{wheel\_actual\_drive}$ and emits this difference as the desired wheel braking torque $M_{wheel\_desired\_brake}$ to the control device of the wheel braking system 2 (FIG. 1). The formation of the difference and the output of the desired wheel braking torque $M_{wheel\_desired\_brake}$ could also be carried out by a control device of the drive system 1.

However, when the defined increased loading of the wheel braking system 2 is not exceeded for a predefined minimum time period or the change of the vehicle velocity v within the predefined time window Δt, which may be equal to the predefined minimum time period, has exceeded a tolerance range T around zero, the increase of the drive braking torque $M_{wheel\_desired\_drive}$ is limited to an amount optimized with respect to aspects of comfort (for example, to an amount which can be reached in the fired coasting operation). For this purpose, the control device of the driver assistance system 3 sends a prompt to the control device of the drive system 1, in which the limited desired drive braking torque ($M_{wheel\_desired\_drive}=M_{drive\_limited}$) is already emitted. The limited desired drive braking torque $M_{drive\_limited}$ can be kept constant. The drive system 1 operates according to this requirement. The control device of the driver assistance system 3 forms the difference between the total braking torque $M_{wheel\_desired\_total}$ and the limited desired drive braking torque $M_{drive\_limited}$ and emits this difference as the desired wheel braking torque $M_{wheel\_desired\_brake}$ to the control device of the wheel braking system 2 (FIG. 2).

The desired drive braking torque can be filed as a characteristic curve in the control device of the driver assistance system 3. By limiting the desired drive braking torque to the amount assigned to a fired coasting operation, particularly an uncomfortable change-over between the fired and the non-filed coasting operation is prevented. With respect to the engine, this change-over cannot be implemented continuously. However, when the increase of the drive braking torque in the steady-state operation can be unlimited, the non-fired coasting operation is also permitted. For a maximal braking assistance, the drive system 1 can not only decide whether a change-over takes place to the non-fired coasting operation but also, whether possibly a transmission downshifting is caused.

However, a limitation of the desired drive braking torque can also take place only by means of an instruction to the drive system 1 which presets a prevention of the of the coasting switch-off of the engine (if this engine is an internal-combustion engine).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of controlling a drive system and a wheel braking system of a vehicle, comprising the acts of:
   adjusting a total braking torque to be applied to the wheels of the vehicle, said total braking torque including a drive braking torque and a desired wheel braking torque, such that the desired wheel braking torque is reduced by an amount which can be compensated by a maximum possible increase of the drive braking torque when a defined increased loading of the wheel braking system is exceeded and a change of a vehicle velocity has not exceeded a predetermined tolerance range within a predefined time window,
   wherein the increase of the drive braking torque is limited to a predefined amount when a defined increased loading of the wheel braking system is not exceeded or the change of the vehicle velocity has exceeded the tolerance range within the predefined time window.

2. The method according to claim 1, wherein
   in the case of the maximum possible increase of the drive braking torque, the amount of reduction of the desired wheel braking torque is predefined corresponding to a drive braking torque adjustable in a non-fired coasting operation.

3. The method according to claim 1, wherein
   in the case of an increase of the drive braking torque, the amount of reduction of the desired wheel braking torque is predefined corresponding to a drive braking torque adjustable in the fired coasting operation.

\* \* \* \* \*